United States Patent [19]
Yoshinari

[11] 4,245,404
[45] Jan. 20, 1981

[54] AUDIO-VISUAL TEACHING MACHINE

[75] Inventor: Yukiyoshi Yoshinari, Akishima, Japan

[73] Assignee: Shinano Kikaku Company Limited, Tokyo, Japan

[21] Appl. No.: 5,920

[22] Filed: Jan. 23, 1979

[30] Foreign Application Priority Data

| Jan. 26, 1978 [JP] | Japan | 53-7672 |
|---|---|---|
| Jan. 26, 1978 [JP] | Japan | 53-7673 |
| Jan. 26, 1978 [JP] | Japan | 53-8260 |

[51] Int. Cl.³ .............................................. G09B 5/06
[52] U.S. Cl. ..... 434/312; 360/72.1, 135; 369/41, 273
[58] Field of Search .............. 35/8 A, 9 A, 9 B, 35 C; 274/42 P

[56] References Cited

U.S. PATENT DOCUMENTS

| 3,648,385 | 3/1972 | Barlow et al. | 35/8 A |
|---|---|---|---|
| 3,659,030 | 4/1972 | Scott | 35/8 A |
| 3,689,930 | 9/1972 | Strickland | 35/8 A X |
| 3,775,864 | 12/1973 | Bisinger et al. | 35/9 A |
| 3,795,989 | 3/1974 | Greenberg et al. | 35/9 B |
| 3,886,671 | 6/1975 | Liu | 35/8 A X |

FOREIGN PATENT DOCUMENTS

1454349  11/1976  United Kingdom ...................... 35/9 B

*Primary Examiner*—William H. Grieb
*Attorney, Agent or Firm*—Cushman, Darby & Cushman

[57] ABSTRACT

An audio-visual teaching machine so made that, when any one of a plurality of independent visual teaching contents respectively appearing in a plurality of windows is pressed with a finger, an audio teaching content corresponding to the pressed visual teaching content may be automatically reproduced so as to be able to efficiently teach with a simple operation. This teaching machine is used together with a teaching card having a plurality of visual teaching contents on one surface and a plurality of magnetic tracks containing audio teaching contents corresponding to the respective visual teaching contents on the other surface. Until the teaching card is correctly set in the teaching machine, a buzzer will continue to sound. When the visual teaching content appearing in the window is pressed with a finger while the teaching card is set in a correct position, a lamp will be lighted to illuminate the window.

5 Claims, 8 Drawing Figures

AUDIO-VISUAL TEACHING MACHINE

BACKGROUND OF THE INVENTION (a) Field of the Invention

This invention relates to an audio-visual teaching machine to be used together with a teaching card indicating on one side surface a plurality of independent visual informations and having on the other side surface a plurality of audio informations related respectively with said visual informations.

(b) Description of the Prior Art

There is already known an audio-visual teaching machine wherein one picture, for example, of an animal and an English word or the like corresponding to it are indicated on a card and, when the card is inserted in a predetermined position in a magnetic reproducing device, the card will be automatically fed to reproduce a pronunciation of the word or a voice explaining the picture to thereby teach an infant. However, in this known machine, only one teaching content is indicated on one card. The audio reproduction of the teaching content is effected by the linear movement of the card and therefore, in the case of repeat teaching of the same content, the card will have to be refitted. The card inserting operation as a whole becomes so frequent that the operation of the machine for teaching an infant becomes awkward.

SUMMARY OF THE INVENTION

A primary object of the present invention is to provide an audio-visual teaching machine wherein a teaching card can be set simply and positively and a very effective teaching can be performed.

This object is attained by providing a teaching machine that utilizes a teaching card having a plurality of independent visual teaching informations and audio teaching informations corresponding respectively to the visual informations that may be used when the card is set in the teaching machine, the respective visual teaching informations may appear in a plurality of independent transparent windows and that, when any one of the visual teaching informations appearing in the respective windows is pressed with a finger, the audio teaching information corresponding to the visual information may be automatically reproduced.

In a preferred embodiment of the present invention, only the pressed window will be illuminated so that the pressing may be visually confirmed.

In another embodiment, until the teaching card is set in a correct position in the machine, a buzzer will continue to sound and, when the teaching card is set in the correct position, the buzzer will stop sounding.

In a further embodiment of the present invention, a receiver is removably fitted to the machine so that, when the receiver is removed, the audio teaching information will be able to be heard only from the receiver.

These and other objects of the present invention will become more apparent during the course of the following detailed description and appended claims.

DESCRIPTION OF THE PREFERRED EMBODIMENT

Figure 1:
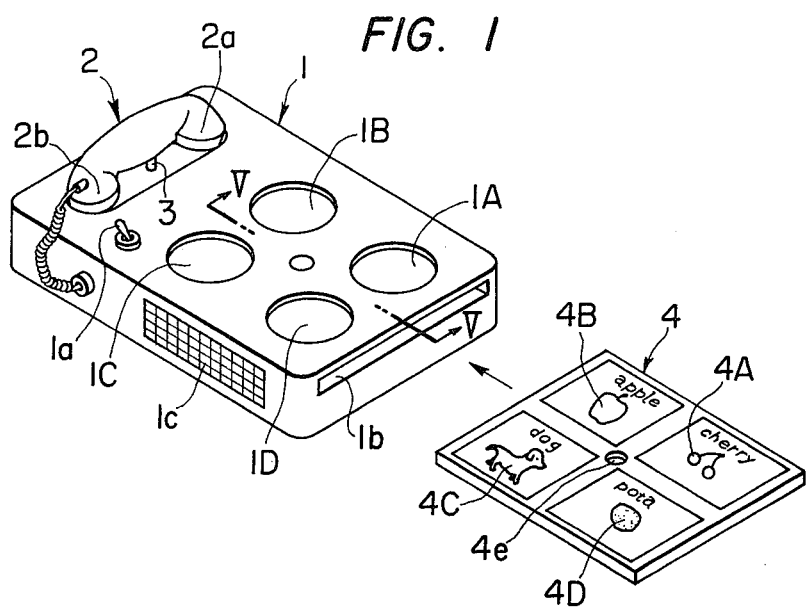
FIG. 1 is a perspective view showing an embodiment of an audio-visual teaching machine according to the present invention and an example of a teaching card for use in the machine.
Figure 7:
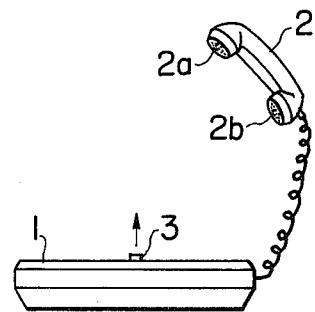
FIG. 7 is a contracted side view of a receiver as removed from the machine body.
Figure 8:
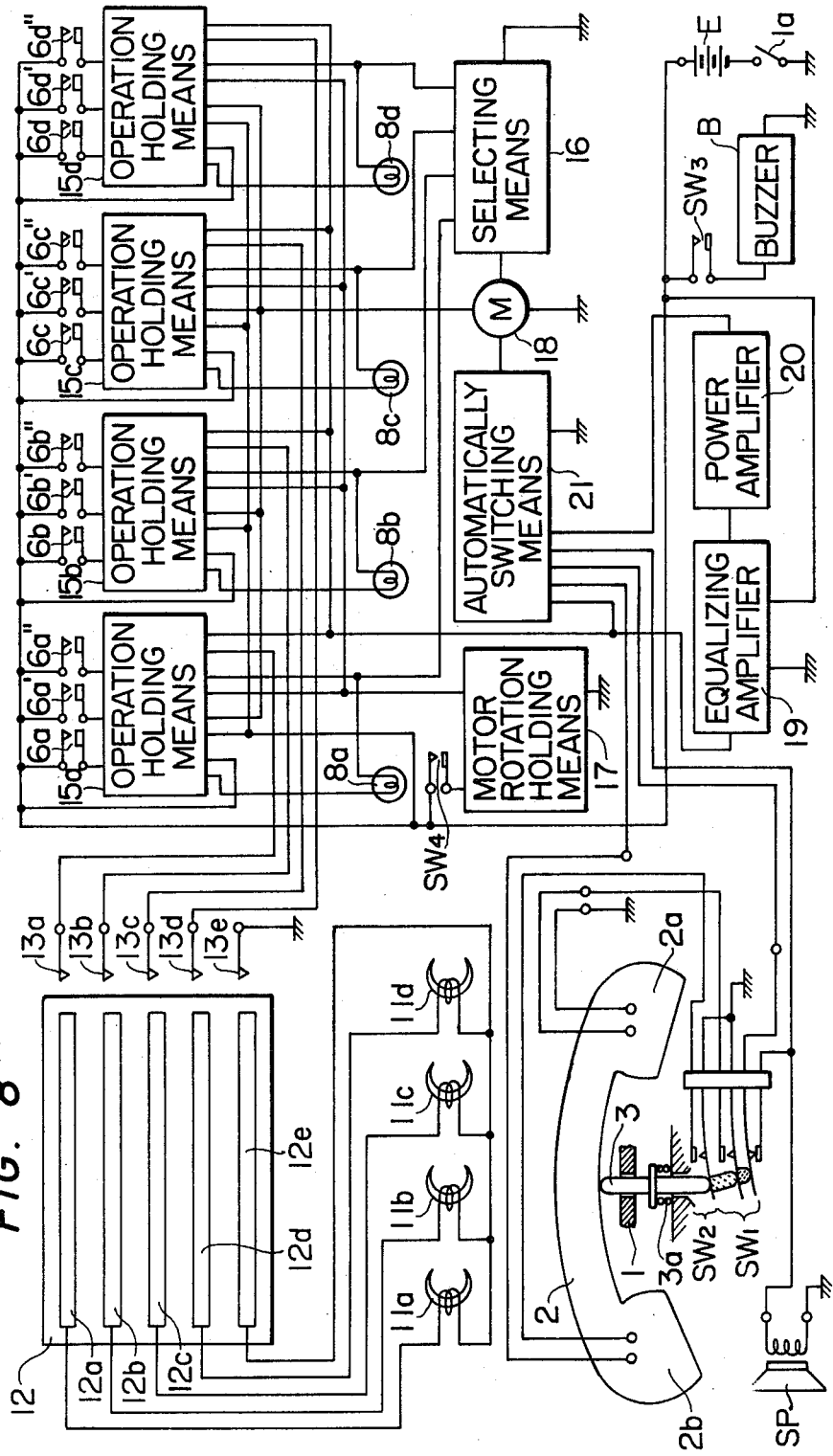
FIG. 8 is a wiring diagram showing an example of an electric circuit part of the audio-visual teaching machine shown in FIG. 1.

With reference to the drawings, reference numeral 1 indicates an audio-visual teaching machine body case having windows 1A, 1B, 1C and 1D and a current source switch 1a on the top wall and a card inserting port 1b and a speaker window 1c on the side wall and containing a later described magnetic reproducing device and driving means within it. Reference numeral 2 indicates a transmitter-receiver in which an earphone 2a and microphone 2b are contained so as to be able to be connected to the magnetic reproducing device respectively through a switching switch $SW_1$ and normally closed switch $SW_2$ (FIG. 8). Reference numeral 3 indicates a switch operating pin, fitted slidably to the top wall portion of the body case 1 and biased upward by a coil spring 3a (see FIG. 8). This operating pin 3 is lowered by the transmitter-receiver 2, connects the switching switch $SW_1$ to the speaker SP side provided within the body case 1 and keeps the normally closed switch $SW_2$ open when the transmitter-receiver 2 is placed on the body case 1 as shown in FIG. 1. Operating pin 3 is raised by the coil spring 3a, connects the switch $SW_1$ to the earphone 2a side and works to return the normally closed switch $SW_2$ to close when the transmitter-receiver 2 is held up as shown in FIG. 7. Reference numeral 4 indicates a teaching card made of a cardboard or the like and having on the front surface a plurality of independent visual teaching informations 4A, 4B, 4C and 4D, for example, including pictures different from one another and English words or the like corresponding respectively to the pictures and on the rear surface magnetic tracks 4a, 4b, 4c and 4d arranged concentrically and arcuately at intervals and having recorded such voices as, for example, of pronunciations of the words and brief explanations of the pictures or the like corresponding respectively to the teaching informations 4A, 4B, 4C and 4D. This teaching card is substantially square, has a hole 4e in the center portion, and is so made that, when it is inserted to a predetermined position within the body case 1 through the inserting port 1b, the visual teaching informations 4A, 4B, 4C and 4D respectively match the windows 1A, 1B, 1C and 1D.

Figure 3:
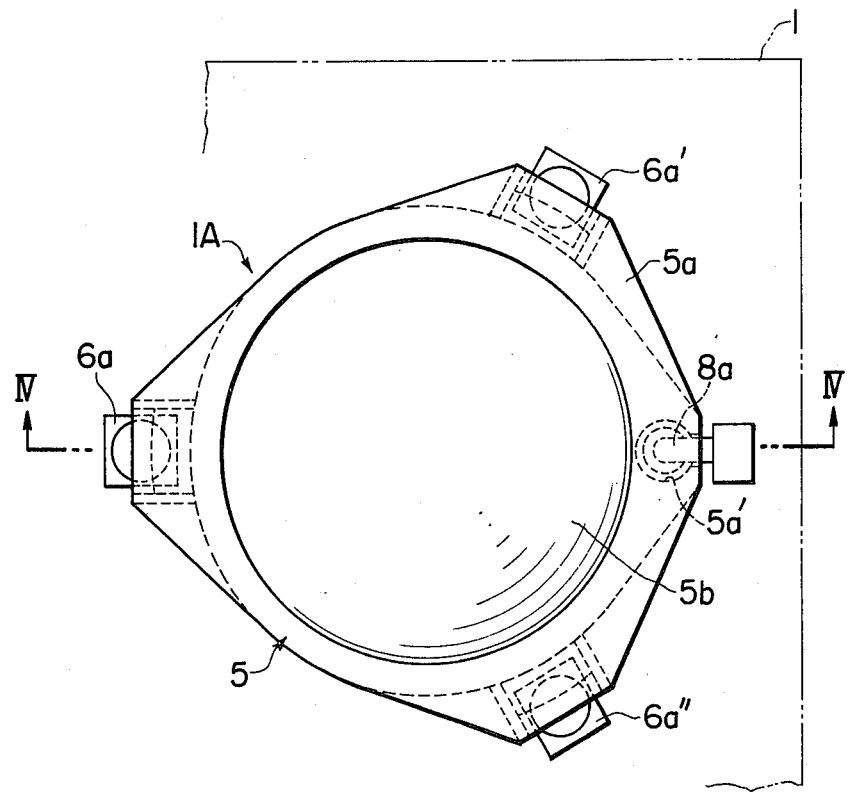
FIG. 3 is an enlarged plan view showing one of transparent window assemblies formed in the top wall of the machine.
Figure 4:
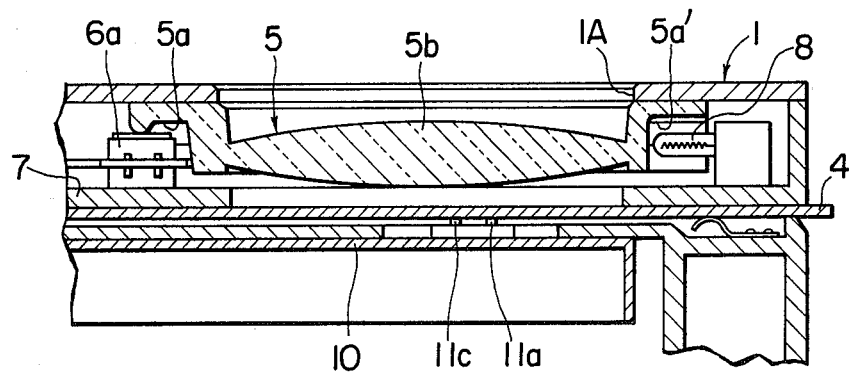
FIG. 4 is a sectional view on line IV—IV in FIG. 3.

FIGS. 3 and 4 show the detailed structures of the window 1A, 1B, 1C and 1D portions. As all the window portions have the same structure, only window 1A is explained in detail below. A substantially convex lens-shaped window frame 5 made of such transparent material as an acryl resin is vertically movably and positioned just below the window 1A formed in the top wall of the body case 1. Reference numerals 6a, 6a' and 6a'' indicate normally opened switches interposed between a flange portion 5a of the window frame 5 and a partition wall 7 and arranged at predetermined positional intervals on the periphery of the lens portion 5b so as to be closed when the window frame 5 is pressed. Each of them has a role of operating a later described operation holding means. Reference numeral 8a indicates such illuminating means as a lamp or luminous diode contained in a cut-off portion 5a' made in the flange portion 5a of the window frame 5 so as to be lighted to illuminate the entire window frame 5 in case any one of the switches 6a, 6a' and 6a" is closed to operate the later described operation holding means as described later. Normally closed switches 6b, 6b' and 6b"; 6c, 6c' and 6c"; 6d, 6d' and 6d" and illuminating means 8b, 8c and 8d are respectively arranged in the other windows 1B, 1C and 1D.

Figure 5:
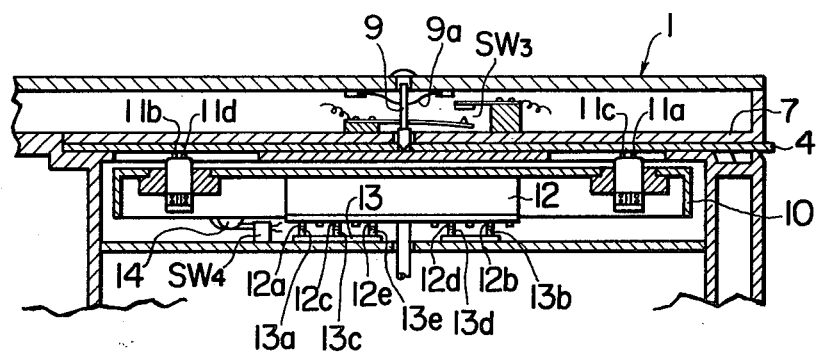
FIG. 5 is an enlarged sectional view of an essential part on line V—V in FIG. 1.
Figure 6:
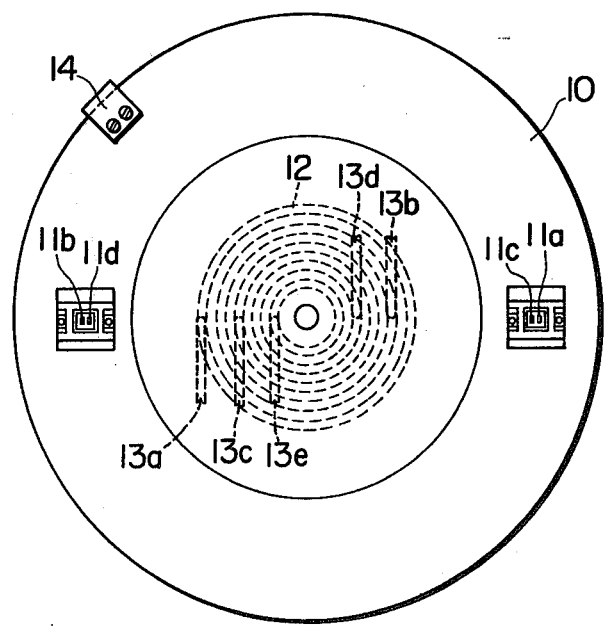
FIG. 6 is a plan view of a turntable provided with reproducing heads.

In FIG. 5, reference numeral 9 indicates a positioning pin supported vertically slidably by the top wall and partition wall 7 of the body case 1 and biased downward by a plate spring 9a supported by the top wall so as to be able to be fitted in the hole 4e of the teaching card 4 only when the teaching card 4 is inserted through the inserting port 1b and the visual teaching informations 4A, 4B, 4C and 4D are matched respectively with the windows 1A, 1B, 1C and 1D. Symbol $SW_3$ indicates a buzzer operating switch having a movable contact piece secured to the positioning pin 9 so as to be opened when the positioning pin 9 is lowered as illustrated and to be closed when the positioning pin 9 is raised. This switch $SW_3$ is connected between a buzzer B and a current source E as shown in FIG. 8. Reference numeral 10 indicates a turntable rotatably supported concentrically with the positioning pin 9 within the body case 1 and able to be rotated at a constant speed by a driving means including a motor or the like. Reference numerals 11a, 11b, 11c and 11d indicate reproducing heads biased upward respectively by coil springs arranged on the turntable 10 so as to be able to respectively contact the magnetic tracks 4a, 4b, 4c and 4d when a teaching card 4 is set in the predetermined position within the body case 1 as shown in FIG. 5. Reference numeral 12 indicates a rotary terminal secured in the center portion of the turntable 10 and having five annular terminal pieces 12a, 12b, 12c, 12d and 12e set concentrically and circularly at intervals. Reference numeral 13 indicates a fixed terminal secured to the body case 1 and having contact terminals 13a, 13b, 13c, 13d and 13e respectively contacting the terminal pieces 12a, 12b, 12c, 12d and 12e. Reference numeral 14 indicates a switch operating piece secured to the outer peripheral portion of the turntable 10 so as to push down and open a normally closed switch $SW_4$ secured to the body case 1 whenever the turntable 10 makes one rotation and to thereby serve to stop the operation of a later described motor rotation holding means and stop the rotation of the turntable 10.

In FIG. 8, reference numerals 15a, 15b, 15c and 15d indicate operation holding means provided to correspond respectively to the windows 1A, 1B, 1C and 1D and working to immediately start the operations, respectively hold the reproducing circuits and driving circuits corresponding respectively to the windows 1A, 1B, 1C and 1D in the operating state as soon as the above described switches 6a, 6a' and 6a"; 6b, 6b' and 6b'; 6c, 6c' and 6c"; 6d, 6d' and 6d" are respectively closed even for a moment, and to stop the operations only when the operation of the later described motor rotation holding means stops. Reference numeral 16 indicates a selecting means working to make the other operation holding means inoperative as soon as there is an input from any one of the operation holding means 15a, 15b, 15c and 15d and to return them to an operative state when there is no input. Reference numeral 17 indicates the motor rotation holding means for starting the rotation a later described motor and hold its rotation when there is an input from any one of the operation holding means 15a, 15b, 15c and 15d and for stopping the rotation of the motor when the switch $SW_4$ is opened. Reference numeral 18 indicates the motor for rotating the turntable 10. Reference numeral 19 indicates an equalizing amplifier. Reference numeral 20 indicates a power amplifier. Reference numeral 21 indicates an automatically switching means working to open the earphone circuit and close the speaker circuit and microphone circuit when the motor 18 is at a stop and to close the earphone circuit and open the speaker circuit when the motor 18 is not rotating.

Figure 2:
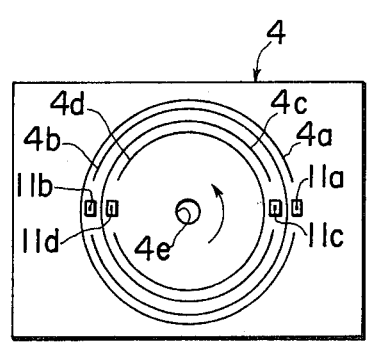
FIG. 2 is an explanatory view showing the relation of magnetic tracks on the rear side surface of the teaching card shown in FIG. 1 and reproducing heads.

The operation of the present teaching machine is explained in the following. When the current source switch 1a is first switched on and the teaching card 4 is indicated by the arrow in FIG. 1 is inserted through the card inserting port 1b and is set in the predetermined position within the body case 1, the visual teaching informations 4A, 4B, 4C and 4D will respectively match the windows 1A, 1B, 1C and 1D and the magnetic tracks 4a, 4b, 4c and 4d will respectively match the moving tracks of the reproducing heads 11a, 11b, 11c and 11d as shown in FIG. 2 to complete the preparation. In such case, from the begining of the insertion of the card 4 until the card 4 reaches the predetermined position within the body case 1, the buzzer B will continue to sound. That is to say, when the front end edge of the card 4 reaches the position of the positioning pin 9, the pin 9 will be pushed up by the card 4 and, as a result, the switch $SW_3$ will close to operate the buzzer B. When the teaching card 4 is further inserted and the hole 4e reaches the position of the pin 9, the pin 9 will fit in the hole 4e and will be lowered by the plate spring 9a. By the this lowering motion of the pin 9, the switch $SW_3$ will be again opened to stop the operation of the buzzer B. Therefore, the sound of the buzzer B will stop thereby informing the user that the card 4 has been set. In other words, as the buzzer B will continue to sound while the card 4 is not set in the predetermined position, any failure to insert the card is easily recognized. After the teaching card 4 is thus set in the predetermined position within the body case 1, for example, if the lens portion 5b of the window 1A is pushed with a finger to lower the window frame 5, any one of the switches 6a, 6a' and 6a" will be always closed and the operation holding means 15a will immediately start the operation. Now, if the transmitter-receiver 2 is mounted on the body case 1 as shown in FIGS. 1 and 8, the switch operating pin 3 will be lowered, the switching switch $SW_1$ will connect to the speaker SP side, the switch $SW_2$ will be opened and the earphone 2a and microphone 2b will be disconnected from the reproducing circuit. When the operation holding means 15a starts the operation as described above, the illuminating means 8a will be lighted to illuminate the entire window 1A and, on the other hand, the driving circuit consisting of the motor 18, motor rotation holding means 17 and current source E will be formed. Therefore, the motor 18 will rotate and the turntable 10 will begin to rotate. In such case, the reproducing circuit consisting of the reproducing head 11a—terminal piece 12a—contact terminal 13a—operation holding means 15a—equalizing amplifier 19—power amplifier 20—automatically switching means 21—switching switch SW₁—current source E—contact terminal 13e—terminal piece 12e will be and reproducing head 11a will pick up the audio recorded in the magnetic tracks 4a with the rotation of the turntable 10 and this voice will be reproduced by the speaker SP. As this audio is an explanation of the teaching content 4 or the pronunciation of the word appearing in the window 1A, an audio-visual teaching will be achieved. In such case, if the transmitter-receiver 2 is held up as shown in FIG. 7, the switch operating pin 3 will rise, the switching switch SW₁ will be connected to the earphone 2a side, therefore, the reproduction of the audio from the speaker SP will stop and instead the audio will be reproduced from the earphone 2a. When the turntable 10 thus makes one rotation, the switch operating piece 14 will open the switch SW₄, therefore the operation of the motor rotation holding means 17 will be stopped, the operation of the operation holding means 15a will be stopped, as a result, the reproducing circuit and driving circuit will return to be opened, the rotation of the turntable will stop in the original position, the reproduction of the voice will also stop and thus one reproducing operation will be completed. This sequence of operations will be made in the same in the case of any one of the other windows 1B, 1C and 1D being pushed with a finger so that audio corresponding respectively to the teaching contents 4B, 4C and 4D may be correctly reproduced. Further, as the present apparatus has the selecting means, even in case all the windows are pushed simultaneously or in case the other windows are pushed during the operation, only the operation holding means corresponding to the first pushed window will operate to correctly reproduce the audio and only the first pushed window will be illuminated.

As already explained, the switches 6a, 6a' and 6a", switches 6b, 6b' and 6b", switches 6c, 6c' and 6c" and switches 6d, 6d' and 6d" are arranged at predetermined positional intervals respectively around the windows 1A, 1B, 1C and 1D. If any portion of a window is pushed, at least one of the switches will always close and therefore operation is guaranteed.

The operation of the present apparatus when the motor 18 is at a stop shall be explained in the following. First, if the transmitter-receiver 2 is placed on the body case 1, as described above, the earphone 2a and microphone 2b will be completely cut off from the electric circuit. In such case, the motor 18 will be at a stop, therefore the automatically switching means 21 will open the earphone circuit and close the speaker circuit and microphone circuit. Here, if the transmitter-receiver 2 is held up as shown in FIG. 7, the switch operating pin 3 will rise, the normally closed switch SW₂ will close, therefore a loud speaker circuit consisting of the microphone 2b—automatically switching means 21—equalizing amplifier 19—power amplifier 20—automatically switching means 21—speaker SP—current source E—normally closed switch SW₂ will be formed and the audio coming in from the microphone 2b will be reproduced louder out of the speaker SP.

In the above, the principle of the present invention has been explained for the embodiment including audio reproduction. However, if sound recording heads and erasing heads are fitted instead of the sound reproducing heads on the turntable so that the reproducing circuit may be switched over to a sound recording circuit, not illustrated by a proper switching switch, the present apparatus will be able to be utilized also as a sound recording device.

What is claimed is:

1. An audio-visual teaching machine to be used together with a teaching card having on one surface a plurality of visual teaching informations and on the other surface a plurality of magnetic tracks containing audio teaching informations, related with said visual teaching informations said machine comprising:

a body case having a plurality of windows formed in the top wall thereof and able to respectively independently indicate said plurality of visual teaching informations, a plurality of vertically movable window frames provided respectively to said plurality of windows, first switches arranged adjacently respectively to said plurality of window frames and able to be closed when said window frames are pushed, and a magnetic reproducing device including a plurality of reproducing heads rotatable while in contact with said magnetic tracks when said teaching card is set in a predetermined position in said teaching machine and able to be operated when said first switches are closed, whereby said audio teaching informations corresponding respectively to said visual teaching informations appearing within said window frames are reproduced when said window frames are pushed.

2. An audio-visual teaching machine according to claim 1 wherein said window frames respectively include a lens modifying said visual teaching informations.

3. An audio-visual teaching machine according to claim 1 further comprising illuminating means arranged adjacently respectively to each of said window frames so as to be lighted to illuminate said window when said window frames are pushed.

4. An audio-visual teaching machine according to claim 1 further comprising:

a positioning pin slidably supported on the top wall of said body case and engageable with said teaching card, a second switch able to be opened and closed by said pin, and a pronouncing means able to be operated by said second switch, said pronouncing means being kept operative through said positioning pin and second switch until said teaching card is set in a predetermined position in said teaching machine.

5. An audio-visual teaching machine according to claim 1 further comprising:

a transmitter-receiver mountable on said body case and including in it a microphone and an earphone connectable to said magnetic reproducing device, a switch operating pin slidably fitted to the top wall of said body case and movable by said transmitter-receiver, and third switches switchable by said operating pin, whereby, said earphone is connected to said magnetic reproducing device through said operating pin and third switches when said transmitter-receiver is removed from said body case during the reproduction, and said microphone and earphone are disconnected from said magnetic reproducing device through said third switches when said transmitter-receiver is mounted on said body case.

* * * * *